United States Patent
Sato et al.

(10) Patent No.: US 6,548,660 B2
(45) Date of Patent: Apr. 15, 2003

(54) PRODUCING METHOD OF CELLULOSE POLYMER

(75) Inventors: Tadahisa Sato, Kanagawa (JP); Katsuyoshi Yamakawa, Kanagawa (JP); Hiroshi Onishi, Kanagawa (JP); Tadahiro Tsujimoto, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/730,824

(22) Filed: Dec. 7, 2000

(65) Prior Publication Data

US 2001/0009960 A1 Jul. 26, 2001

(30) Foreign Application Priority Data

Dec. 8, 1999 (JP) ............................................. 11-349534
Aug. 14, 2000 (JP) ......................................... 2000-245916
Oct. 13, 2000 (JP) ......................................... 2000-313651

(51) Int. Cl.$^7$ .............................. C08B 3/06; C08B 3/24; C08B 3/28
(52) U.S. Cl. .............................. 536/69; 536/56; 536/63; 536/124; 536/127; 536/123.1; 264/207
(58) Field of Search .............................. 536/63, 69, 56, 536/124, 127, 123.1; 264/207

(56) References Cited

U.S. PATENT DOCUMENTS 5,512,231 A * 4/1996 Thies et al.
5,962,667 A * 10/1999 Murakami et al.

OTHER PUBLICATIONS

Brandrup, J et al. Polymer Handbook, 4th ed., 1999 by John Wiley & Sons, pp. 59–61.*

* cited by examiner

Primary Examiner—Samuel Barts
Assistant Examiner—Michael C. Henry
(74) Attorney, Agent, or Firm—Burns, Doane, Swecker & Mathis, LLP

(57) ABSTRACT

A producing method of a cellulose polymer powder is provided, which comprises dissolving a cellulose polymer by exposure to an organic solvent containing, as the main component, an ester-based solvent having from 2 to 8 carbon atoms, a ketone-based solvent having from 4 to 10 carbon atoms, or an alcohol-based solvent having from 3 to 6 carbon atoms, and carbon dioxide, and then removing the carbon dioxide and the organic solvent from the solution. A producing method of an organic solvent solution of a cellulose polymer is also provided.

8 Claims, No Drawings

PRODUCING METHOD OF CELLULOSE POLYMER

FIELD OF THE INVENTION

The present invention relates to a producing method of a cellulose series polymer. Specifically, the present invention relates to a producing method of cellulose series polymer powder which is soluble in an organic solvent and a producing method of an organic solvent solution wherein a cellulose series polymer is dissolved in high concentration.

BACKGROUND OF THE INVENTION

Cellulose series polymers, in particular, cellulose esters have high dimensional stability and heat resistance, and sticky as compared with synthetic resins for general use. Due to these characteristics, cellulose esters are formed to various products, e.g., films and fibers as well as used as the materials of plastics and lacquers. A cellulose ester film is representative of the support of photographic materials, and they are also used as the members of liquid crystal display (e.g., a protective film of a polarizing plate, a support of an optical compensation sheet, and a color filter) due to their optical isotropy. Moreover, a demand for biodegradable polymers has been increasingly raised in recent years from the viewpoint of the environmental protection and, as a result, the importance of cellulose series polymers have been appreciated anew.

Thus, it is thought that the importance of cellulose series polymers represented by cellulose esters will increase hereafter. On the other hand, chlorine-based solvents, such as methylene chloride, have been widely used as the solvent to make the solution of cellulose series polymers for forming films and the like, because they have a high solubility and can be easily removed at low boiling point. However, chlorine-based solvents are toxic substances such as having carcinogen or environmentally deleterious substances represented by ozone layer depletion, therefore, the use of chlorine-based solvents has been restricted very much. The discharge of methylene chloride into the air is severely restricted for the latter reason.

Accordingly, studies for solving these problems have been actively pursued in these years and some techniques have been disclosed. For example, methods of using cyclic diethers such as 1,3-dioxane and 1,3-dioxolan (e.g., JP-A-8-143708 (the term "JP-A" as used herein means an "unexamined published Japanese patent application") and JP-A-8-323785), and methods of using fluoro-alcohols such as trifluoroethanol (e.g., JP-A-8-143709 and JP-A-11-60807) are disclosed. However, cyclic diethers of the former case are not necessarily perfect in safety and have a drawback that they are highly flammable. On the other hand, fluoro-alcohols of the latter case is expensive and it is not practicable to be used in a large quantity as the solvent for polymer formation.

Accordingly, the use of safe and inexpensive solvents such as acetone, ethanol, methyl acetate and ethyl acetate has been examined but it is difficult to dissolve cellulose series polymers, such as cellulose ester, in these solvents in concentrations required in the production of films, etc., by merely a mixing means. Therefore, a variety of means for increasing solubility are now under investigation. Specific examples of these methods include (1) a method of using a means of cooling dissolution (*Makromol. Chem.*, 143, 105 (1971) (e.g., JP-A-9-95538 and JP-A-9-95544), (2) a method of applying extra-high pressure (e.g., JP-A-11-21379), (3) a method of using ultrasonic wave (e.g., JP-A-11-71463), and (4) a method according to a means of a two-component system mixed fluid under high pressure of acetone, triacetin, methanol or ethanol and carbon dioxide (e.g., U.S. Pat. No. 5,512,231 and *Journal of Supercritical Fluids*, 13, 135 (1998)).

The above methods (1) to (4) are certainly effective for improving solubility but there are big problems in every of them from the viewpoint of an industrial producing method. That is, for obtaining sufficient solubility according to method (1), an extremely low temperature such as −70° C. is necessary, which requires a vast sum of facility investment. For obtaining sufficient solubility according to method (2), extra-high pressure of almost 100 MPa is necessary, hence the realization of practical use is also industrially difficult in view of facilities. In method (3), it is necessary to develop an ultrasonic wave generating apparatus which can be used in an industrial scale and it is considerably practicably difficult at this point of time. In method (4), a sufficient amount of cellulose series polymers cannot be dissolved, and the stability of the solution with the lapse of time is low, and partial gelation is occur.

Thus, it can be said that an industrially practicable technique of dissolving cellulose series polymers without using environmentally deleterious chlorine-based solvents to form films with small facility investment has not yet been found. Therefore, such is the state of things that the development of a novel method is strongly desired.

SUMMARY OF THE INVENTION

Accordingly, an object of the present invention is to provide a producing method of cellulose series polymers, in particular, cellulose ester powder or the organic solvent solution of cellulose ester which is high in safety, small in environmental load, and light in imposition of facility investment (i.e., inexpensive).

The present inventors have repeated examinations for solving the above problems. As a result, the present inventors have found that when a cellulose polymer is dispersed and stirred in an organic solvent other than chlorine-based polymers and liquid carbon dioxide is added to the dispersion in an appropriate weight ratio and stirred, the polymer is dissolved, and the polymer once dissolved does not precipitate and dissolved in the organic solvent after the carbon dioxide is removed, and that the powder obtained by removing the organic solvent has excellent solubility as compared with polymers not subjected to this treatment. The present invention has been attained based on the above finding.

That is, the present invention provides the following.

(1) A process for producing a cellulose polymer powder which comprises the steps of dissolving a cellulose polymer by exposure to an organic solvent containing, as the main component, an ester-based solvent having from 2 to 8 carbon atoms, a ketone-based solvent having from 4 to 10 carbon atoms, or an alcohol-based solvent having from 3 to 6 carbon atoms, and carbon dioxide, and then removing the carbon dioxide and the organic solvent from the solution.

(2) A process for producing an organic solvent solution of a cellulose polymer which comprises dissolving a cellulose polymer by exposure to an organic solvent containing, as the main component, an ester-based solvent having from 2 to 8 carbon atoms, a ketone-based solvent having from 4 to 10 carbon atoms, or an alcohol-based solvent having from 3 to 6 carbon atoms, and carbon dioxide.

(3) The process as described in the above item (1) or (2), wherein the cellulose polymer is dissolved at the temperature and the pressure not lower than the critical temperature and the critical pressure of carbon dioxide.

(4) The process as described in the above item (1) or (2), wherein the cellulose polymer is cellulose acetate having the degree of acetylation of 55.0% or more and the concentration of the polymer in the organic solvent solution is 10 mass % or more.

As the preferred embodiments of the above-described present invention, the followings can be exemplified.

(5) The process as described in the above item (1) or (2), wherein said cellulose polymer is cellulose ester.

(6) The process as described in the above item (5), wherein said cellulose ester is acetyl cellulose.

(7) The process as described in the above item (6), wherein said acetyl cellulose has the acetylation degree of 58% or more.

DETAILED DESCRIPTION OF THE INVENTION

The present invention will be described in detail below.

As the cellulose polymers for use in the present invention, for example, cellulose ester and cellulose ether can be exemplified. Specifically, cellulose ester includes aliphatic carboxylic acid esters such as cellulose acetate, cellulose butyrate, and cellulose propionate, aromatic carboxylic acid esters such as phthalic acid ester, inorganic acid esters such as cellulose nitrate, cellulose sulfate, and cellulose phosphate, mixed acid esters such as cellulose acetate propionate, cellulose acetate butyrate, cellulose acetate phthalate, and cellulose nitrate acetate, and cellulose ester derivatives such as polycaprolactone grafted cellulose acetate. Specifically, cellulose ether includes methyl cellulose, ethyl cellulose, benzyl cellulose and carboxymethyl cellulose.

A preferred cellulose series polymer is cellulose ester, and cellulose acetate (acetyl cellulose) is especially preferred.

The average degree of substitution of cellulose ester is preferably from about 1 to 3. The average degree of polymerization of cellulose ester is preferably from 10 to 1,000, more preferably from 50 to 900, and most preferably from 200 to 800.

The degree of acetylation of cellulose ester is preferably from 30 to 62.5%, more preferably 55% or more, and particularly preferably 58% or more.

The organic solvents for use in the present invention are described below. The organic solvents for use in the present invention do not substantially contain a chlorine-based solvent such as methylene chloride. The terminology "do not substantially contain" means that the ratio of the chlorine-based solvent in the organic solvent is less than 5 mass % (preferably less than 2 mass %, more preferably does not contain at all).

In the present invention, "the main component" of a solvent means that the solvent is a single solvent (having purity of 99 mass % or more), or that the solvent has the highest ratio (mass % in a mixed solvent) in a mixed solvent of two or more solvents. In the case of a mixed solvent, the solvents other than the main component may be the solvents restricted in the present invention or may be the solvents other than the solvents restricted in the present invention. When a part of a mixed solvent is water, the ratio of water is preferably 5 mass % or less, particularly preferably 2 mass % or less.

When the organic solvent for use in the present invention is a mixed solvent of two or more organic solvents, the ratio of the solvent as the main component is preferably 30 mass % or more, particularly preferably 80 mass % or more. The organic solvents which can be used in the present invention are an ester-based solvent having from 2 to 8 carbon atoms, a ketone-based solvent having from 4 to 10 carbon atoms, and an alcohol-based solvent having from 3 to 6 carbon atoms, preferably an ester-based solvent having from 2 to 4 carbon atoms, a ketone-based solvent having from 4 to 6 carbon atoms, and an alcohol-based solvent having 3 or 4 carbon atoms. These solvents may have cyclic structure.

More specifically, the examples of the organic solvents which can be used in the present invention include ester-based solvents, e.g., methyl formate, ethyl formate, propyl formate, pentyl formate, methyl acetate, ethyl acetate, butyl acetate and hexyl acetate, ketone-based solvents, e.g., methyl ethyl ketone, diethyl ketone, diisobutyl ketone, cyclopentanone, cyclohexanone and methylcyclohexanone, and alcohol-based solvents, e.g., n-propanol, isopropanol, n-butanol, n-pentanol, n-hexanol, ethoxyethanol and ethylene glycol.

Preferred organic solvents which are used in the present invention include ester-based solvents alone and mixed solvents containing ester-based solvents as the main component, and particularly preferably a single solvent of methyl acetate alone and a mixed solvent containing methyl acetate as the main component and an alcohol-based solvent and/or a ketone-based solvent.

The amount of the organic solvents for use for cellulose polymers is generally such that the concentration of the dissolved polymer in an organic solvent solution becomes 1 mass % or more, preferably from 2 to 80 mass %, and especially preferably from 10 to 70 mass %. The amount of carbon dioxide to be used is preferably from 0.1 to 50, particularly preferably from 0.5 to 30, with the polymer as 1 in mass ratio.

When the powder or solution of a cellulose polymer is produced according to the method of the present invention, a plasticizer, a deterioration-preventing agent, an ultraviolet absorber and/or a light piping-preventing dye may be added. As the plasticizer, phosphate or carboxylate is mainly used. Specific examples of the plasticizers include phosphate, e.g., triphenyl phosphate, tricresyl phosphate, and biphenyldiphenyl phosphate, and carboxylate, e.g., diethyl phthalate, dioctyl phthalate, diethylhexyl phthalate, acetyltriethyl citrate, tributyl citrate, butyl oleate, and dibutyl sebacate.

The specific examples of the deterioration-preventing agents are the compounds disclosed in JP-A-5-197073. The specific examples of the ultraviolet absorbers are the compounds disclosed in JP-A-7-11056. The light piping-preventing dye is a dye soluble in an organic solvent which can prevent light piping by coloring a film base, and the specific examples include Spirit Black (manufactured by Chuo Kagaku Co., Ltd.) and Nigrosine Base EX (manufactured by Orient Kagaku Kogyo Co., Ltd.).

In the next place, the step of exposing the organic solvent having dispersed therein a cellulose polymer to carbon dioxide is described. The reaction apparatus is required to be resistant to high pressure and heating. Apparatuses called autoclaves are generally used, and a variety of apparatuses are easily commercially available according to the pressure and the solvents to be used. Although generally used autoclaves made of stainless steel that are resistant to internal pressure of 30 MPa (about 300 atm) are sufficient as the apparatuses for use in the present invention, it is convenient and preferable to use a volume-variable type autoclave in the experiment for finding out the optimum conditions.

The present invention is described below by specific procedure. A necessary amount of cellulose polymer to be dissolved is put in an autoclave and the lid of the autoclave is closed. The oxygen in the autoclave is purged by carbon dioxide or nitrogen gas, and then the necessary amount of the solvent to be used is introduced into the apparatus by pumping. The method of introducing carbon dioxide into the apparatus is generally performed by any of the following three methods.

That is, 1) a method of weighing the amount of carbon dioxide to be introduced by another weighing vessel and introducing by pumping, 2) a method of determining the amount of carbon dioxide to be introduced from the flow rate and the introducing time of carbon dioxide, and 3) a method of determining the amount of carbon dioxide introduced from the internal pressure.

The internal pressure of an autoclave is decided by the capacity of the autoclave, the amount of the solvent introduced, the amount of carbon dioxide and the temperature. For achieving the objective temperature and pressure, it is necessary to select an autoclave having an appropriate capacity in accordance with the amounts of the solvent and carbon dioxide to be used. When the size of the autoclave is limited, it is necessary to use corresponding amounts of the solvent and carbon dioxide. For obtaining high internal pressure with a small use amount of carbon dioxide, a volume-variable type autoclave is used, or an auxiliary means is used, such as pressure application by other high pressure gases, e.g., nitrogen gas. Pressure is generally from 0.1 to 100 MPa, preferably from 7.4 to 60 MPa. Since a special pressure-resisting autoclave is necessary when pressure of 30 MPa or more is applied, pressure is especially preferably from 8 to 30 MPa at which ordinary autoclaves can be used.

The temperature for dissolution after introduction of carbon dioxide is from 20 to 300° C., preferably from 31 to 200° C., and particularly preferably from 40 to 180° C.

The time required for dissolution is generally 100 hours or less, preferably from 1 minute to 30 hours, and particularly preferably from 30 minutes to 10 hours.

In the present invention, it is preferred to dissolve the cellulose polymer at the temperature and the pressure not lower than the critical temperature and the critical pressure of carbon dioxide. Further, the critical point of carbon dioxide is 31° C. (7.4 MPa).

A method of obtaining the organic solvent solution of a cellulose polymer by exposing the cellulose polymer to an organic solvent and carbon dioxide is described below. When carbon dioxide is introduced and heated, the temperature is restored to room temperature, and carbon dioxide is discharged by opening the valve little by little so as not to cause vigorous bubbling until the internal pressure of the autoclave becomes atmospheric pressure. It is preferred to scavenge carbon dioxide to another cooled vessel at this time. When the internal pressure is reached to atmospheric pressure, the carbon dioxide in the organic solvent is thoroughly removed by means of an aspirator, etc., by reducing the pressure a little. It is preferred at this time to take out some organic solvent from the system to make the system a little concentrated. Thus, an organic solvent solution containing the polymer in high concentration can be obtained.

The methods of obtaining the powder of a cellulose polymer is described below. Generally used methods of powdering can be arbitrarily selected according to purpose in the present invention, e.g., a method of drying the above-obtained organic solvent solution of a cellulose polymer with a band drier and removing the solvent thoroughly, and then powdering the dried product with a pulverizer, and a method of atomizing the organic solvent solution of a cellulose polymer by high pressure injection from a nozzle.

EXAMPLE

The present invention will be illustrated with referring to examples below but it should not be construed as the present invention is limited thereto.

Example 1

Twenty (20) grams of cellulose acetate each having different degree of acetylation and degree of polymerization was weighed and put into a volume-variable type autoclave having a content volume of 200 ml, and 80 g of the organic solvent shown in Table 1 defined in the present invention was added thereto. The lid was closed, a nitrogen gas bomb was connected and the oxygen in the autoclave was purged off, the valve of the air exit was closed, subsequently 20 g of liquefied carbon dioxide was charged by a feeding pump. The external temperature was then adjusted to 100° C., the volume of the inside of the autoclave was adjusted, the internal pressure was made 10.0 MPa and the content was stirred for 1 hour. The temperature was then lowered to room temperature, the original volume of the inside of the autoclave was restored, and then the valve was opened to get the carbon dioxide out of the autoclave. Thus, Sample Nos. 1 to 5 were obtained.

Comparative Sample Nos. 1 to 4 were produced in the same manner as above except for using acetone, triacetin, ethanol or methanol as the organic solvent.

The results obtained are shown in Table 1. All of Sample Nos. 1 to 5 according to the present invention were transparent and homogeneous solutions. This shows that cellulose acetate is completely dissolved. Comparative Sample Nos. 1 to 4 were swollen and in slurry state. This shows that cellulose acetate is only partially dissolved.

TABLE 1

| Sample No. | Cellulose Acetate | | Solvent | Solubilit |
|---|---|---|---|---|
| | Acetylation Degree | Polymerization Degree | | |
| Sample 1 | 60.9 | 299 | Methyl acetate | Homogeneous and transparent solution |
| Sample 2 | 60.9 | 299 | Methyl ethyl ketone | Homogeneous and transparent solution |

TABLE 1-continued

| Sample No. | Cellulose Acetate Acetylation Degree | Cellulose Acetate Polymerization Degree | Solvent | Solubilit |
|---|---|---|---|---|
| Sample 3 | 60.2 | 323 | Butanol | Homogeneous and transparent solution |
| Sample 4 | 59.2 | 395 | Methyl acetate/ethanol (85/15) | Homogeneous and transparent solution |
| Sample 5 | 59.5 | 350 | Cyclohexanone | Homogeneous and transparent solution |
| Comparative Sample 1 | 60.9 | 299 | Acetone | Swollen and in slurry state (partially dissolved) |
| Comparative Sample 2 | 60.9 | 299 | Triacetin | Swollen and in slurry state (partially dissolved) |
| Comparative Sample 3 | 60.2 | 323 | Ethanol | Swollen and in slurry state (partially dissolved) |
| Comparative Sample 4 | 59.2 | 395 | Methanol | Swollen and in slurry state (partially dissolved) |

(Temperature: 100° C., Internal pressure: 10.0 MPa, Cellulose acetate: 20.0 g, Solvent: 80 g, $CO_2$: 20 g)

Example 2

Sample Nos. 1 to 5 and Comparative Sample Nos. 1 to 4 were dried with a band drier to remove the solvent, and then pulverized with a crasher. The thus-obtained powders were designated as Sample Nos. 6 to 10 and Comparative Sample Nos. 5 to 8, respectively. The solubility of these samples in the same solvents used in Example 1 respectively was examined under atmospheric pressure. The results obtained are shown in Table 2. Each of Sample Nos. 6 to 10 according to the present invention showed the solubility in the solvent (10 mass % or more) but Comparative Sample Nos. 5 to 8 showed only low solubility.

TABLE 2

| Sample No. | Powder | Solvent | Solubility (mass %) |
|---|---|---|---|
| Sample 6 | Powder coming from Sample 1 | Methyl acetate | 14 |
| Sample 7 | Powder coming from Sample 2 | Methyl ethyl ketone | 13 |
| Sample 8 | Powder coming from Sample 3 | Butanol | 10 |
| Sample 9 | Powder coming from Sample 4 | Methyl acetate/ ethanol (85/15) | 13 |
| Sample 10 | Powder coming from Sample 5 | Cyclohexanone | 15 |
| Comparative Sample 5 | Powder coming from Comparative Sample 1 | Acetone | 6 |
| Comparative Sample 6 | Powder coming from Comparative Sample 2 | Triacetin | 5 |
| Comparative Sample 7 | Powder coming from Comparative Sample 3 | Ethanol | 3 |
| Comparative Sample 8 | Powder coming from Comparative Sample 4 | Methanol | 3 |

Example 3

Twenty (20) grams of cellulose acetate each having different degree of acetylation and degree of polymerization was weighed and put into an autoclave having a content volume of 200 ml, and 90 g of the organic solvent shown in Table 3 was added thereto. The lid was closed, a nitrogen gas bomb was connected and the oxygen in the autoclave was purged off, the valves of the air exit and the liquid inlet were closed, the valve of other inlet was opened and 10 g of liquefied carbon dioxide was charged by a feeding pump, and then the valve was closed. Subsequently, the valve of the inlet of nitrogen gas was opened again, and nitrogen gas was charged with a pressure pump until the internal pressure became 10.0 MPa. The external temperature was then adjusted to 90° C., and the content was stirred for 1 hour. The internal pressure was 13.5 MPa. The temperature was then lowered to room temperature, and then the valve was opened to get the carbon dioxide and the nitrogen gas out of the autoclave. Thus, Sample Nos. 11 to 15 were obtained.

Comparative Sample Nos. 9 to 12 were produced in the same manner as above except for using acetone, triacetin, ethanol or methanol as the organic solvent.

The results obtained are shown in Table 3. All of Sample Nos. 11 to 15 according to the present invention were transparent and homogeneous solutions. This shows that cellulose acetate is completely dissolved. Comparative Sample Nos. 9 to 12 were swollen and in slurry state. This shows that cellulose acetate is only partially dissolved.

TABLE 3

| Sample No. | Cellulose Acetate Acetylation Degree | Polymerization Degree | Solvent | Solubility |
|---|---|---|---|---|
| Sample 11 | 60.9 | 299 | Methyl acetate | Homogeneous and transparent solution |
| Sample 12 | 60.9 | 299 | Methyl ethyl ketone | Homogeneous and transparent solution |
| Sample 13 | 60.2 | 323 | Butanol | Homogeneous and transparent solution |
| Sample 14 | 59.2 | 395 | Methyl acetate/ethanol (85/15) | Homogeneous and transparent solution |
| Sample 15 | 59.5 | 350 | Cyclohexanone | Homogeneous and transparent solution |
| Comparative Sample 9 | 60.9 | 299 | Acetone | Swollen and in slurry state (partially dissolved) |
| Comparative Sample 10 | 60.9 | 299 | Triacetin | Swollen and in slurry state (partially dissolved) |
| Comparative Sample 11 | 60.2 | 323 | Ethanol | Swollen and in slurry state (partially dissolved) |
| Comparative Sample 12 | 59.2 | 395 | Methanol | Swollen and in slurry state (partially dissolved) |

(Temperature: 90° C., Internal pressure: 13.5 MPa, Cellulose acetate: 20.0 g, Solvent: 90 g, $CO_2$: 10 g)

Example 4

Sample Nos. 11 to 15 and Comparative Sample Nos. 9 to 12 were dried with a band drier to remove the solvent, and then pulverized with a crasher. The thus-obtained powders were designated as Sample Nos. 16 to 20 and Comparative Sample Nos. 13 to 16, respectively. The solubility of these samples in the same solvents used in Example 3 respectively was examined under atmospheric pressure. The results obtained are shown in Table 4. Each of Sample Nos. 16 to 20 according to the present invention showed the solubility in the solvent (10 mass % or more) but Comparative Sample Nos. 13 to 16 showed only low solubility.

TABLE 4

| Sample No. | Powder | Solvent | Solubility (mass %) |
|---|---|---|---|
| Sample 16 | Powder coming from Sample 11 | Methyl acetate | 15 |
| Sample 17 | Powder coming from Sample 12 | Methyl ethyl ketone | 13 |
| Sample 18 | Powder coming from Sample 13 | Butanol | 10 |
| Sample 19 | Powder coming from Sample 14 | Methyl acetate/ethanol (85/15) | 14 |
| Sample 20 | Powder coming from Sample 15 | Cyclohexanone | 14 |
| Comparative Sample 13 | Powder coming from Comparative Sample 9 | Acetone | 7 |
| Comparative Sample 14 | Powder coming from Comparative Sample 10 | Triacetin | 6 |
| Comparative Sample 15 | Powder coming from Comparative Sample 11 | Ethanol | 4 |
| Comparative Sample 16 | Powder coming from Comparative Sample 12 | Methanol | 4 |

Example 5

Ten (10) grams of cellulose acetate each having different degree of acetylation and degree of polymerization was weighed and put into an autoclave having a content volume of 200 ml, and 100 g of the organic solvent shown in Table 5 was added thereto. The lid was closed, a nitrogen gas bomb was connected and the oxygen in the autoclave was purged off, the valve of the air exit was closed, subsequently carbon dioxide gas was charged by a feeding pump until the internal pressure became 7.0 MPa. The introduced carbon dioxide was about 20 g, although a little uneven due to the solvent used. The external temperature was then adjusted to 90° C., and the content was stirred for 1 hour. The internal pressure was about 8.7 MPa. The temperature was then lowered to 50° C., and then the valve was opened to get the carbon dioxide out of the autoclave. Thus, Sample Nos. 21 to 25 were obtained.

Comparative Sample Nos. 17 to 20 were produced in the same manner as above except for using a nitrogen gas bomb in place of a carbon dioxide gas bomb.

All of Sample Nos. 21 to 25 and Comparative Sample Nos. 17 to 20 were transparent and homogeneous solutions at 50° C. Each sample was cooled to 25° C. and allowed to stand at 25° C. for 2 days. The results obtained are shown in Table 5.

All of Sample Nos. 21 to 25 remained transparent and homogeneous but all of Comparative Sample Nos. 17 to 20 were gelated partially and became white turbid.

TABLE 5

| | Cellulose Acetate | | | Solubility | |
| --- | --- | --- | --- | --- | --- |
| Sample No. | Acetylation Degree | Polymerization Degree | Solvent | Just After Coating | After Being Allowed to Stand at 25° C. for 2 Days |
| Sample 21 | 60.9 | 299 | Methyl acetate | Homogeneous and transparent solution | Homogeneous and transparent solution |
| Sample 22 | 60.9 | 299 | Ethyl acetate/butanol (85/15) | Homogeneous and transparent solution | Homogeneous and transparent solution |
| Sample 23 | 60.2 | 323 | Isopropyl methyl ketone | Homogeneous and transparent solution | Homogeneous and transparent solution |
| Sample 24 | 59.2 | 395 | Methyl acetate/ethanol/butanol (85/10/5) | Homogeneous and transparent solution | Homogeneous and transparent solution |
| Sample 25 | 59.5 | 350 | Cyclohexanone | Homogeneous and transparent solution | Homogeneous and transparent solution |
| Comparative Sample 17 | 60.9 | 299 | Acetone | Homogeneous and transparent solution | Partially gelled, white turbid |
| Comparative Sample 18 | 60.9 | 299 | Triacetin | Homogeneous and transparent solution | Partially gelled, white turbid |
| Comparative Sample 19 | 60.2 | 323 | Ethanol | Homogeneous and transparent solution | Partially gelled, white turbid |
| Comparative Sample 20 | 59.2 | 395 | Methanol | Homogeneous and transparent solution | Partially gelled, white turbid |

(Temperature: 90° C., Internal pressure: 8.7 MPa, Cellulose acetate: 10.0 g, Solvent: 100 g, $CO_2$: about 20 g)

According to the present invention, the powders of cellulose polymers which are safe, inexpensive, and excellent in solubility in an organic solvent can be produced and, further, a highly concentrated and stable organic solvent solution of cellulose polymers can be produced. Thus, according to the present invention, it is possible to produce materials for forming films, etc., inexpensively without using chlorine-based solvents, e.g., methylene chloride, which are high in environmental load and toxicity. Accordingly, the present invention also widens the possibility of the use of cellulose polymers in biodegradable polymers and the like While the invention has been described in detail and with reference to specific examples thereof, it will be apparent to one skilled in the art that various changes and modifications can be made therein without departing from the spirit and scope thereof.

This application is based on Japanese patent applications No. Hei-11-349534 filed on Dec. 8, 1999, No. 2000-245916 filed on Aug. 14, 2000, and No. 2000-313651 fled on Oct. 13, 2000, the entire contents of which incorporated herein by reference.

What is claimed is:

1. A process for producing a cellulose polymer powder which comprises the steps of dissolving a cellulose polymer by exposure to an organic solvent containing, as the main component, a compound selected from the group consisting of methyl acetate, ethyl acetate, methyl ethyl ketone, isopropyl methyl ketone, cyclohexanone, butanol and mixtures thereof, and carbon dioxide, and then removing the carbon dioxide and the organic solvent from the solution, wherein the cellulose polymer is dissolved at a temperature and pressure not lower than the critical temperature and critical pressure of carbon dioxide, the cellulose polymer is cellulose acetate having a degree of acetylation of 55.0% or more, and the concentration of the polymer in the organic solvent solution is 10 mass % or more.

2. The process as claimed in claim 1, wherein said cellulose acetate has the acetylation degree of 58% or more.

3. The process as claimed in claim 1, wherein said organic solvent contains methyl acetate as the main component.

4. A process for producing an organic solvent solution of a cellulose polymer which comprises dissolving a cellulose polymer by exposure to an organic solvent containing, as the main component, a compound selected from the group consisting of methyl acetate, ethyl acetate, methyl ethyl ketone, isopropyl methyl ketone, cyclohexanone, butanol and mixtures thereof, and carbon dioxide, wherein the cellulose polymer is dissolved at a temperature and pressure not lower than the critical temperature and critical pressure of carbon dioxide, the cellulose polymer is cellulose acetate having the degree of acetylation of 55.0% or more and the concentration of the polymer in the organic solvent solution is 10 mass% or more.

5. The process as claimed in claim 4, wherein said cellulose acetate has the acetylation 58% or more.

6. The process as claimed in claim 4, wherein said organic solvent contains methyl acetate as the main component.

7. A process according to claim 1, wherein the ratio of the organic solvent as the main component is 30 mass % or more.

8. A process according to claim 4, wherein the ratio of the organic solvent as the main component is 30 mass % or more.

* * * * *